United States Patent Office 3,116,529
Patented Jan. 7, 1964

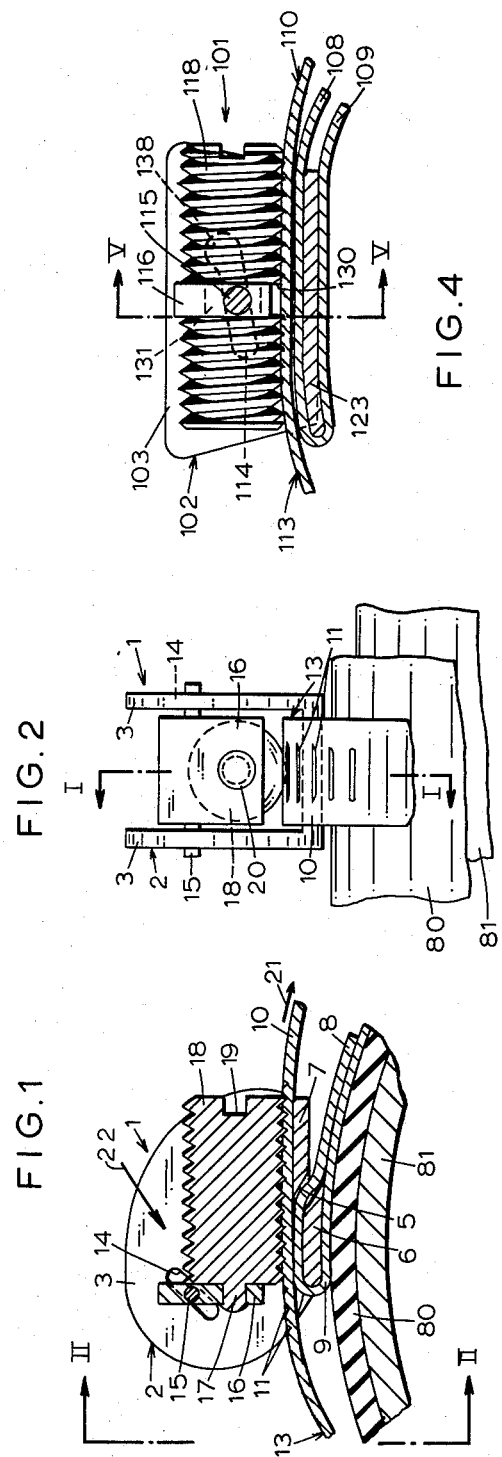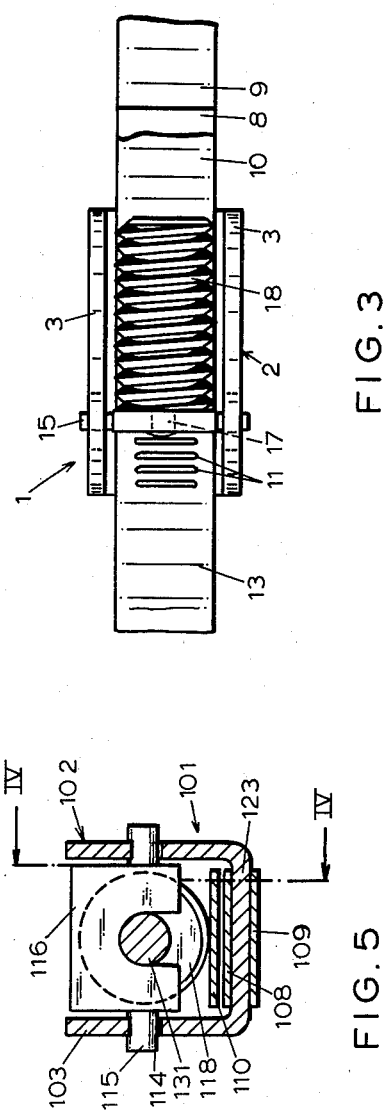
Jan. 7, 1964  W. HENNING  3,116,529
STRAP CLAMP
Filed Jan. 9, 1962  2 Sheets-Sheet 1
WOLFGANG HENNING
INVENTOR.

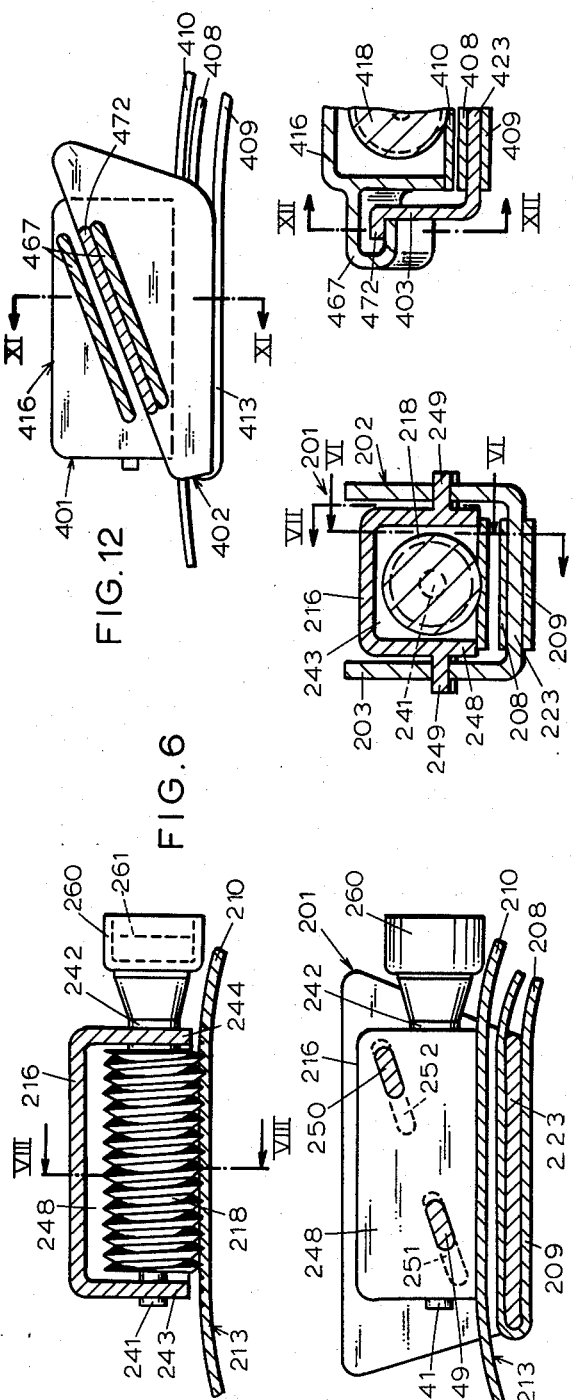

---

3,116,529
STRAP CLAMP
Wolfgang Henning, Niedermarsberg, Westphalia, Germany, assignor to GEMI-Metallwarenfabrik, Niedermarsberg, Germany, a company of Germany
Filed Jan. 9, 1962, Ser. No. 165,475
Claims priority, application Germany Oct. 11, 1961
8 Claims. (Cl. 24—274)

My present invention relates to a clamp for adjustably fastening together the ends of a metallic or other strap adapted to be used, for example, as a coupling for hoses or pipes.

Conventional hose clamps use metal straps with a bracket fastened to one end and a worm journaled in the bracket for threaded engagement with the suitably grooved other end of the strap whereby the latter may be tightened about the associated hose by rotation of the worm. It is generally necessary to use straps of considerable width and thickness in order to afford the threads of the worm a sufficiently strong grip to insure effective clamping action. In view of the limitation on strap thickness imposed by the need for adequate flexibility, the thread-engaging grooves or notches must in many cases pass through the entire thickness of the strap with resulting weakening thereof.

It is, therefore, an object of this invention to provide an improved strap clamp of the general type described wherein the above disadvantages are avoided.

A more particular object of my invention is to provide a strap clamp whose mounting bracket is detachably secured to the strap in a manner which not only enables quick and easy replacement of straps (e.g. in case of wear or to fit articles of different sizes) but also prevents the bracket from bearing directly upon the article.

A related object of the invention is to provide a strap clamp whose bracket is attached to the strap in a manner imposing only minor limitations upon the flexibility of the latter whereby the strap can easily be curved to fit the shape of the embraced article.

Another important object of the present invention is to provide means for facilitating the quick release of the strap from its engagement with the tensioning worm.

In accordance with this invention I provide, in a strap clamp of the general character set forth, a worm holder which is mounted for limited longitudinal displacement relative to the bracket together with the worm journaled therein, the bracket and the worm holder being provided with mating formations for guiding the holder along a path sloping toward the strap in response to longitudinal strap tension exerted upon the threads of the worm.

The guiding formations on the bracket and the worm holder may comprise slots on one of these members and co-operating projections on the other, or equivalent wedge elements such as inclined ledges on the two members in sliding engagement with one another. As the worm holder is shifted forwardly, i.e. in the direction of strap pull in which the guide path defined by these formations converges with the strap, the threads of the worm are caused to bite progressively more deeply into the notched strap surface so as to prevent relative disengagement even if both the notches and the threads are comparatively shallow. It is thus no longer necessary to provide deep, throughgoing cuts in the strap even where the thickness of the strap is small; the worm, in turn, can be designed as a simple grub screw. Moreover, by a reverse displacement of strap and holder it is possible to release the parts quickly after only a slight preliminary rotation of the worm in a strap-slackening sense. The guiding formations may, to accelerate such disengagement, be cut back or recessed to enable a lifting of the worm off the strap in a retracted position of the holder.

The above and other objects, features and advantages of my invention will become more fully apparent from the following detailed description of certain embodiments, reference being made to the accompanying drawing in which:

FIG. 1 is a longitudinal sectional view, taken on the line I—I of FIG. 2, of a strap clamp according to the invention;

FIG. 2 is an end view taken on the line II—II of FIG. 1;

FIG. 3 is a top plan view of the device shown in FIGS. 1 and 2;

FIG. 4 is a side view, partly in section on the line IV—IV of FIG. 5, of a different clamp according to the invention;

FIG. 5 is a cross-sectional view taken on the line V—V of FIG. 4;

FIG. 6 is a view, similar to FIG. 4, of a worm holder for another modified clamp shown in section along line VI—VI of FIG. 8;

FIG. 7 shows the worm holder of FIG. 6 together with its mounting bracket in a sectional view taken on the line VII—VII of FIG. 8;

FIG. 8 is a cross-sectional view taken on the line VIII—VIII of FIG. 6;

FIG. 9 is a view similar to FIG. 7 of still another embodiment of the invention;

FIG. 10 is a cross-sectional view taken on line X—X of FIG. 9;

FIG. 11 is a fragmentary cross-sectional view of yet a further modification, taken on the line XI—XI of FIG. 12; and FIG. 12 is a view similar to FIG. 7, taken on line XII—XII of FIG. 11.

The strap clamp 1 shown in FIGS. 1–3 comprises a bracket 2 of generally U-shaped profile with upstanding arms 3. The bight of the U is transversely split at 5 to form a lower cross-bar 6 and an upper cross-bar 7 relatively staggered by approximately the thickness of the strap 13 to be accommodated. This strap has an end 8 which passes through the slot 5 of bracket 2 and is bent at 9 around the bar 6 thereof; its other end 10, provided with transverse notches 11, passes above the end 8 and the bar 7 of bracket 2. The strap 13 is slung around an object to be clamped, e.g. a rubber hose 80 to be attached to an inserted piece of metal pipe 81, and is tensioned by the engagement of the threads of a worm 18 with its notches 11. Worm 18, shown as a grub screw with shallow threads, is journaled in a plate-shaped holder 16 by a stud 17 having an enlarged head 20; the holder 16, in turn, is provided with transverse pivot pins 15 received in slots 14 of bracket arms 3 inclined at a small angle to the surface of base 6, 7.

The end of worm 18 remote from holder 16 is provided with a transverse slot 19, or equivalent formation engageable by a screwdriver or similar tool, so as to be readily turned in holder 16 to tension the strap 13 by displacing the extremity 10 thereof in the direction indicated by the arrow 21 in FIG. 1. This results in a leftward movement of worm 18 as viewed in FIGS. 1 and 3 whereby, owing to the inclination of the slots 14, the pivots 15 are cammed downwardly to urge the thread of the worm into firm contact with the notches 11. It will be understood that these notches are to be so numerous as to be engageable by the worm in a relatively slack position of the strap 13, upon an initial manual shifting of the worm down the slots 14 as indicated by arrow 22 in FIG. 1, and to enable both an initial tightening and a subsequent retensioning of the strap; the end 10, which may have been clipped to size in conformity with the circumference of the object 80, need not project more than a slight distance beyond the parts 7 and 18. As will be readily apparent, the traction exerted by the strap end 10 upon the worm threads not only urges the pivots 15 downwardly in the direction of arrow 22 but also tends to swing the worm 18 clockwise (as viewed in FIG. 1) about these pivots whereby the remote end of the worm is also pressed into firm contact with the strap.

When it is desired to release the coupling, worm 18 is rotated through a few turns in the reverse sense whereupon it can be readily lifted up with a sliding of the pivots 15 in their slots 14 against the direction of arrow 22.

The device 101 of FIGS. 4 and 5 comprises a worm 118 which is mounted in a bracket 102 with the aid of a holder 116 in the form of a generally horseshoe-shaped plate. Worm 118 has an annular groove 130 into which the holder 116 is snapped with slight cold deformation so as to embrace the reduced portion 131 of the worm over an angle somewhat greater than 180°; holder 116 has a pair of transverse pivots 115 which are journaled in respective slots 114 in lateral arms 103 of bracket 102. The base 123 of the bracket is here unbroken and encircled in its entirety by the looped extremity 108, 109 of a strap 113 whose other extremity 110 is threaded through the space between part 123 and worm 118 above end 108. The inclined slots 114 have been provided at their rearward extremities with upward extensions 138 adapted to accommodate the pivots 115 in a position in which the worm 118 is withdrawn from bracket portion 123 to facilitate the insertion or the removal of the strap.

In FIGS. 6–8 I have shown a clamp 201 whose worm 218 is journaled in a hood-shaped holder 216 by means of two axially extending pivots 241, 242 rotatable in the end walls 243, 244 of the hood. The side walls 248 of holder 216 are each formed with elongated and inclined lugs 249, 250 slidably received in aligned slots 251, 252 of the arms 203 of bracket 202. Pivot 242 terminates in a cap 260 provided with a screwdriver slot 261. As in the preceding embodiment, the extremity 208, 209 of strap 213 is looped around the base 223 of the U-shaped bracket 202. This system functions in generally the same manner as the ones heretofore described, except that the worm 218 is constrained to move parallel to itself and to the strap end 210 on account of its positive guidance by the lugs 249, 250.

The device 301 of FIGS. 9 and 10 is quite similar to the clamp 201, except that the upstanding arms 303 of bracket 302 are formed with bent-over edges which constitute sloping ribs 363 replacing the slots 251, 252 of the preceding embodiment. The ribs 363 bear upon the lugs 349, 350 on the side of the holder 316 in which the worm 318 is journaled by studs 341, 342; the lugs 349, 350 are aligned with each other and could be considered as portions of a continuous rib. Again, the runs 308, 309 of strap 313 are looped around bracket portion 343 whereas its run 310 is clamped between the looped part and the worm.

The strap clamp 401 of FIGS. 11 and 12 is, in turn, generally similar to clamp 301, with the modification that the upper edges of the arms 403 of bracket 402 are bent outwardly to form sloping ribs 472 while the holder 416 is provided with laterally projecting, bent-over fins 467 which curl around the ribs 472 for positive guidance thereby in a downward direction as the worm 418 is rotated in a strap-tightening sense. Worm 418 bears upon the notched end 410 of strap 413 while the other end 408, 409 of the strap is looped around the base portion 423 of the bracket.

The versatility of my improved clamp enables its use for a wide variety of applications with only a limited number of stock sizes of flexible straps.

While I have disclosed a variety of means for automatically and positively exerting a desired strap-gripping force upon rotation of a clamping worm in engagement with a notched strap portion, other modifications will, of course, be readily apparent to persons skilled in the art and are intended to be embraced in the spirit and scope of the invention as defined in the appended claims.

I claim:
1. A clamp comprising a bracket attachable to an end of a flexible strap slung about an object, said bracket having a base adapted to be overlain by another end of said strap provided with surface notches, holder means secured to said bracket with freedom of relative movement in a direction inclined toward said base, worm means journaled in said holder means for rotation about an axis substantially parallel to said base, said holder means and said bracket being respectively provided with co-operating first and second formations for positively guiding said worm means in said direction toward said base upon mating engagement of said notches with the threads of said worm means and rotation of the latter in a strap-tightening sense, said bracket being of generally U-shaped configuration with upstanding arms and a bight portion forming said base, said second formation comprising inclined guide surfaces provided on said arms, said first formation being lateral projections slideably engageable with said guide surfaces, and means for preventing angular displacement of said worm means about said lateral projections.

2. A clamp according to claim 1 wherein said inclined guide surfaces are formed as longitudinal edges of slots provided in said arms, said slots, at their extremities remote from said base, extensions directed away from said base, having said projections being adapted to enter said extensions for separation of said worm means from said base.

3. A clamp according to claim 1 wherein the last-mentioned means includes a linear surface provided on said first formation and complementarily engaging said guide surfaces.

4. A clamp according to claim 3 wherein said first formation includes a pair of laterally projecting lugs spaced apart along the respective guide surface on opposite sides of said holder means and bearing upon said guide surface.

5. A clamp according to claim 1 wherein said holder means comprises a hood partly surrounding said worm means, said first and second formations including co-operating rib portions on said bracket and said hood.

6. A clamp according to claim 5 wherein the edges of said arms are bent outwardly and form the rib portions on said bracket, the rib portions on said hood being bent around said edges in engagement therewith.

7. In combination, a generally U-shaped bracket having a base with upstanding arms, a flexible strap having an end looped about at least part of said base and another end provided with a set of transverse notches overlying said base, a holder secured to said bracket with freedom of relative movement in a direction inclined toward said base, a worm journaled in said holder for rotation about an axis substantially parallel to said base, said holder and said bracket being respectively provided with co-operating first and second formations for positively guiding said worm in said direction toward said base upon mating engagement of said notches with the threads of said worm and rotation of the latter in a sense tending to tighten said strap about an object embraced thereby, said second formation comprising inclined guide surfaces, said first formation including at least one pair of oppositely extending lateral projections on said holder slideably engaging said surfaces, and means for preventing angular displacement of said worm about said projections.

8. The combination according to claim 7 wherein said notches extend only partly into said strap from its surface adjoining said worm, the opposite surface of said strap being substantially smooth.

References Cited in the file of this patent

UNITED STATES PATENTS

| | | |
|---|---|---|
| 1,584,935 | Hathorn | May 18, 1926 |
| 1,776,850 | Cheswright | Sept. 30, 1930 |
| 2,268,211 | Hathorn | Dec. 30, 1941 |
| 2,689,998 | O'Shei | Sept. 28, 1954 |
| 2,767,455 | Schaefer | Oct. 23, 1956 |

FOREIGN PATENTS

| | | |
|---|---|---|
| 602,458 | Great Britain | May 27, 1948 |